United States Patent
Tsuji et al.

(10) Patent No.: US 11,181,190 B2
(45) Date of Patent: Nov. 23, 2021

(54) RANGE SWITCHING DEVICE

(71) Applicant: SUBARU CORPORATION, Tokyo (JP)

(72) Inventors: Taichi Tsuji, Tokyo (JP); Masahide Mita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 243 days.

(21) Appl. No.: 16/425,187

(22) Filed: May 29, 2019

(65) Prior Publication Data

US 2020/0080633 A1    Mar. 12, 2020

(30) Foreign Application Priority Data

Sep. 11, 2018   (JP) .............................. JP2018-169335

(51) Int. Cl.
*F16H 59/10*   (2006.01)
*F16H 63/42*   (2006.01)
*F16H 59/02*   (2006.01)

(52) U.S. Cl.
CPC ....... *F16H 59/105* (2013.01); *F16H 59/0204* (2013.01); *F16H 63/42* (2013.01)

(58) Field of Classification Search
CPC .................................................. F16H 59/105
See application file for complete search history.

(56) References Cited

U.S. PATENT DOCUMENTS

| 2004/0259685 A1* | 12/2004 | Inoue ..................... F16H 59/105 477/118 |
| 2006/0258503 A1 | 11/2006 | Inoue et al. |
| 2011/0257852 A1 | 10/2011 | Ishino et al. |
| 2014/0157931 A1* | 6/2014 | Hayashi .................. F16H 61/12 74/473.3 |

(Continued)

FOREIGN PATENT DOCUMENTS

| JP | 2005-007993 A | 1/2005 |
| JP | 2011-225033 A | 11/2011 |

OTHER PUBLICATIONS

Japanese Office Action, dated Jun. 23, 2020, in Japanese Application No. 2018-169335 and English Translation thereof.

*Primary Examiner* — Joseph Brown
(74) *Attorney, Agent, or Firm* — McGinn I.P. Law Group, PLLC.

(57) ABSTRACT

A range switching device includes a momentary selector lever movable on a shift gate, a position detector, a moving speed acquisition unit, a passage time acquisition unit, a determination time setting unit, a timing unit, and a determination unit. A neutral position determination region is disposed on a movement path between a home position determination region, a forward travel position determination region, and a reverse travel position determination region. When the selector lever moves from the forward travel position determination region toward the neutral position determination region, the passage time acquisition unit obtains an expected passage time based on a moving speed (Continued)

of the selector lever. The determination time setting unit sets a neutral determination time in accordance with the expected passage time. When the time measured by the timing unit reaches the neutral determination time or longer, the determination unit determines that the neutral position is selected.

18 Claims, 5 Drawing Sheets

(56) References Cited

U.S. PATENT DOCUMENTS

| | | | |
|---|---|---|---|
| 2016/0327151 A1* | 11/2016 | Backes | F16H 61/0213 |
| 2018/0180173 A1* | 6/2018 | Yamazaki | F16H 59/0204 |
| 2018/0201126 A1* | 7/2018 | Yuma | G01D 5/2033 |

* cited by examiner

RANGE SWITCHING DEVICE

CROSS-REFERENCE TO RELATED APPLICATIONS

The present application claims priority from Japanese Patent Application No. 2018-169335 filed on Sep. 11, 2018, the entire contents of which are hereby incorporated by reference.

BACKGROUND

The disclosure relate to a range switching device, particularly to a range switching device employing a shift-by-wire mechanism.

In recent years, put into practical use is a vehicle (automatic transmission) including a shift-by-wire (SBW) mechanism that detects an operation position of a shift lever (selector lever) by a sensor and drives an actuator (for example, an electric motor) based on the detection result, thereby switching a shift range of the automatic transmission.

Further, as a shifter (selector) having the SBW, the following momentary shifter is put into practical use. That is, the momentary shifter includes a shift lever movable on a shift gate (shift pattern) having a neutral (N) position on a path between a home (H) position, a forward travel (D) position, and a reverse travel (R) position. The shift lever automatically returns to the home position when not operated (see, for example, Japanese Unexamined Patent Application Publication (JP-A) No. 2005-7993).

Here, JP-A No. 2005-7993 discloses a transmission shift operation device that has the momentary function as described above and that can appropriately respond to a driver's request. More specifically, the shift operation device stores a position of the shift lever before the shift lever passes the neutral position in advance. When the position is the home position, the shift operation device sets a shorter neutral position recognition time TN(1). When the position of the shift lever before the shift lever passes the neutral position is the forward travel position or the reverse travel position, the shift operation device sets a longer neutral position recognition time TN(2).

According to the shift operation device described in JP-A No. 2005-7993, when a driver wants to move the shift lever from the home position to the neutral position, shortening the neutral position recognition time TN(1) enables to recognize (determine) in a short time that the shift lever is in the neutral position. On the other hand, when the shift lever returns from the forward travel position or the reverse travel position to the home position, lengthening the neutral position recognition time TN(2) makes it difficult to recognize that the shift lever is in the neutral position (that is, prevents erroneous determination).

SUMMARY

An aspect of the disclosure provides a range switching device including a momentary selector lever, a position detector, a moving speed acquisition unit, a passage time acquisition unit, a determination time setting unit, a timing unit, and a determination unit. The momentary selector lever is movable on a shift gate having a neutral position determination region, a home position determination region, a forward travel position determination region, and a rearward travel position determination region. The neutral position determination region is disposed on a movement path between the home position determination region, the forward travel position determination region, and the reverse travel position determination region. The selector lever is configured to automatically return to the home position determination region when not operated. The position detector is configured to detect a position of the selector lever. The moving speed acquisition unit is configured to obtain a moving speed of the selector lever in accordance with a change in the detected position of the selector lever over time. The passage time acquisition unit is configured to, when the selector lever moves from the forward travel position determination region or the reverse travel position determination region toward the neutral position determination region, obtain an expected passage time expected to be taken for the selector lever to pass the neutral position determination region based on the obtained moving speed of the selector lever. The determination time setting unit is configured to set a neutral determination time for determining whether the neutral position is selected, in accordance with the obtained expected passage time. The timing unit is configured to measure a time during which the selector lever is located in the neutral position determination region. The determination unit is configured to, when the measured time reaches the neutral determination time or longer, determine that the neutral position is selected.

An aspect of the disclosure provides a range switching device including a momentary selector lever, a position detector, and a determination unit. The momentary selector lever is movable on a shift gate having a neutral position determination region, a home position determination region, a forward travel position determination region, and a rearward travel position determination region. The neutral position determination region is disposed on a movement path between the home position determination region, the forward travel position determination region, and the reverse travel position determination region. The selector lever is configured to automatically return to the home position determination region when not operated. The position detector is configured to detect whether the selector lever is located in the neutral position determination region, the forward travel position determination region, the reverse travel position determination region, or the home position determination region. The determination unit is configured to, when the selector lever is located in any of the neutral position determination region, the forward travel position determination region, the reverse travel position determination region, and the home position determination region for a predetermined time or more, determine that a range corresponding thereto is selected. When determining that a forward travel range is selected, the determination unit stops determining whether the neutral position is selected until the selector lever is then detected to be located in the home position determination region or the reverse travel position determination region. When determining that the reverse travel position is selected, the determination unit stops determining whether the neutral position is selected until the selector lever is then detected to be located in the home position determination region or the forward travel position determination region.

An aspect of the disclosure provides a range switching device including a momentary selector lever, a position detector, and circuitry. The momentary selector lever is movable on a shift gate having a neutral position determination region, a home position determination region, a forward travel position determination region, and a rearward travel position determination region. The neutral position determination region is disposed on a movement path between the home position determination region, the forward travel position determination region, and the reverse travel position determination region. The selector lever is configured to automatically return to the home position determination region when not operated. The position detector is configured to detect a position of the selector lever. The circuitry is configured to obtain a moving speed of the selector lever in accordance with a change in the detected position of the selector lever over time. The circuitry is configured to, when the selector lever moves from the forward travel position determination region or the reverse travel position determination region toward the neutral position determination region, obtain an expected passage time expected to be taken for the selector lever to pass the neutral position determination region based on the obtained moving speed of the selector lever. The circuitry is configured to set a neutral determination time for determining whether the neutral position is selected, in accordance with the obtained expected passage time. The circuitry is configured to measure a time during which the selector lever is located in the neutral position determination region. The circuitry is configured to, when the measured time reaches the neutral determination time or longer, determine that the neutral position is selected.

An aspect of the disclosure provides a range switching device including a momentary selector lever, a position detector, and circuitry. The momentary selector lever is movable on a shift gate comprising a neutral position determination region, a home position determination region, a forward travel position determination region, and a rearward travel position determination region. The neutral position determination region is disposed on a movement path between the home position determination region, the forward travel position determination region, and the reverse travel position determination region. The selector lever is configured to automatically return to the home position determination region when not operated. The position detector is configured to detect a position of the selector lever. The circuitry is configured to obtain a moving speed of the selector lever in accordance with a change in the detected position of the selector lever over time. The circuitry is configured to, when the selector lever moves from the forward travel position determination region or the reverse travel position determination region toward the neutral position determination region, obtain an expected passage time expected to be taken for the selector lever to pass the neutral position determination region on a basis of the obtained moving speed of the selector lever. The circuitry is configured to set a neutral determination time for determining whether the neutral position is selected, in accordance with the obtained expected passage time. The circuitry is configured to measure a time during which the selector lever is located in the neutral position determination region. The circuitry is configured to, when the measured time reaches the neutral determination time or longer, determine that the neutral position is selected.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

Figure 1:
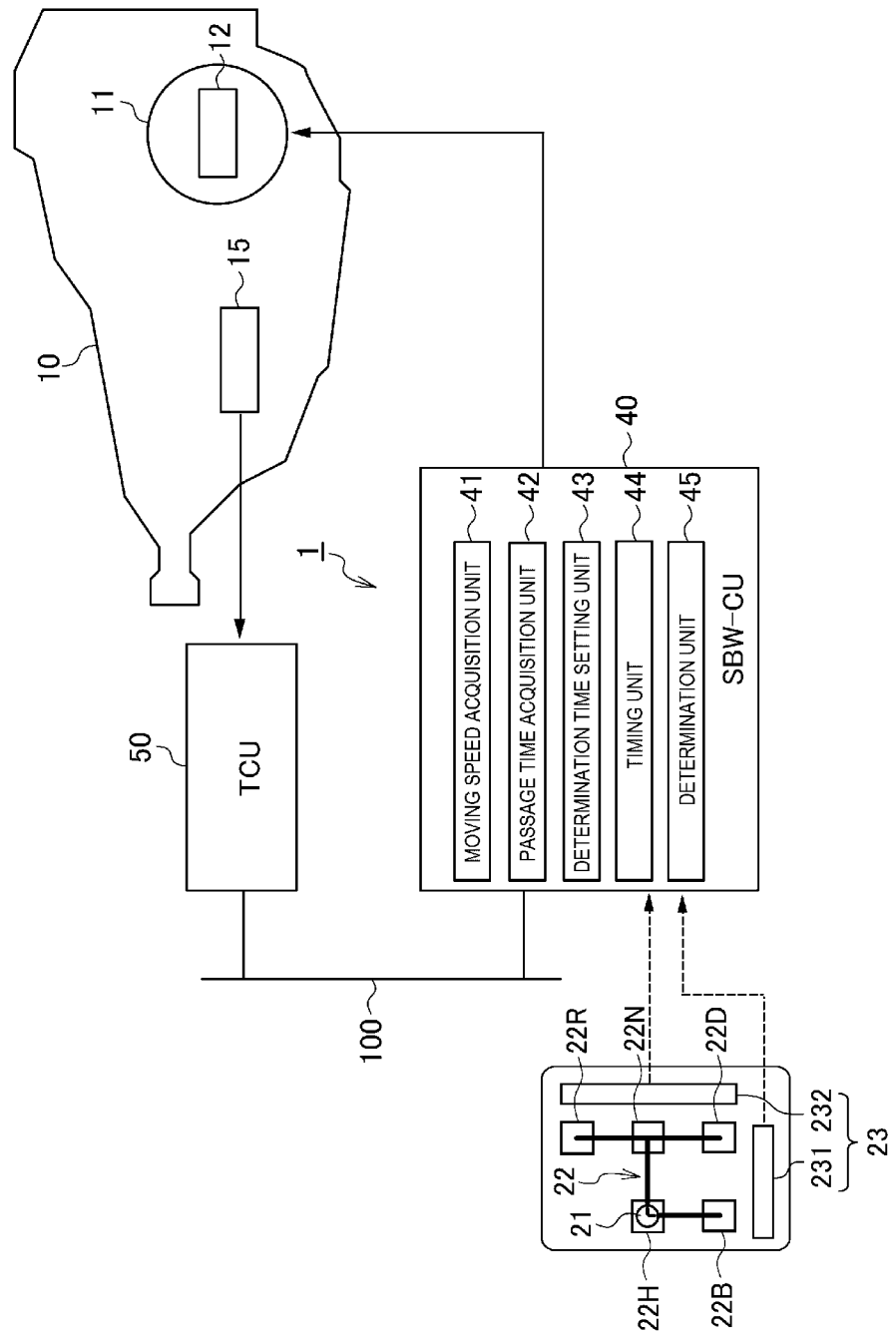
FIG. 1 is a block diagram illustrating the configuration of a range switching device according to a first embodiment.

DETAILED DESCRIPTION tail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. Consider the case where the neutral position recognition time TN(2) is lengthened. For example, it is assumed that a driver holds the shift lever in the forward travel position, then wants to switch from the forward travel range to the neutral range, and operates (moves) the shift lever from the forward travel position to the neutral position. In this case, there is a concern that the driver may feel a sense of discomfort when he/she cannot set the neutral range smoothly while wanting to set the neutral range. On the other hand, when the neutral position recognition time TN(2) is shortened, an erroneous determination may be made when a return speed of the shift lever becomes slow, for example, at a very low temperature or the like.

It is desirable to provide a range switching device that includes a momentary selector lever movable on a shift gate having a neutral position, a home position, a forward travel position, and a reverse travel position, the neutral position being disposed on a movement path between the home position, the forward travel position, and the reverse travel position, the selector lever configured to automatically return to the home position when not operated, the range switching device that can determine whether (i) the selector lever returns by the momentary function or (ii) a driver wants to select the neutral position when the selector lever moves from the forward travel position or the reverse travel position to the neutral position, without making an error or giving the driver a sense of discomfort.

First Embodiment

Figure 2:
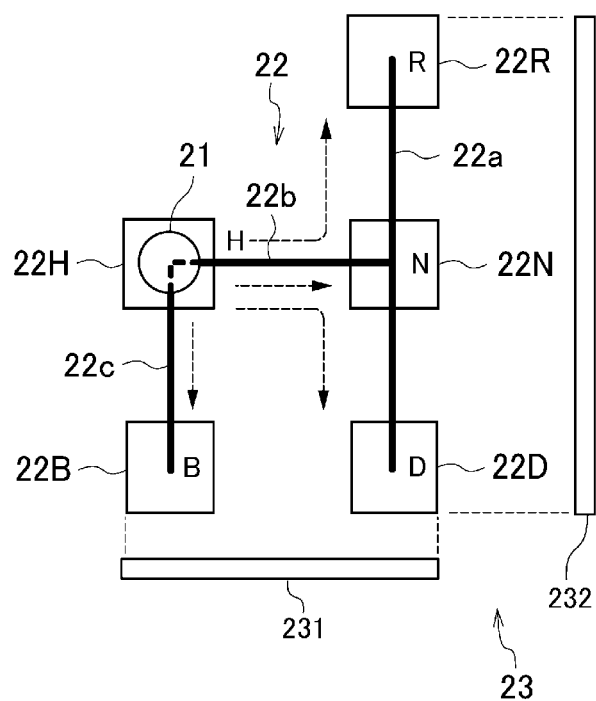
FIG. 2 is a diagram illustrating a shift gate and position determination regions.

First, the configuration of a range switching device 1 according to a first embodiment will be illustrated with reference to FIGS. 1 and 2. FIG. 1 is a block diagram illustrating the configuration of the range switching device 1. FIG. 2 is a diagram illustrating a shift gate 22 and respective position determination regions.

The range switching device 1 switches a shift range of an automatic transmission 10. The range switching device 1 may be referred to as a "selector". The range switching device 1 mainly includes a selector lever 21, a position sensor 23, and a shift-by-wire control unit (SBW-CU) 40. The selector lever 21 receives an operation to select a shift range of the automatic transmission 10. The selector lever 21 may be referred to as a "shift lever". The position sensor 23 detects a position of the selector lever 21. The position sensor 23 includes a first position sensor 231 and a second position sensor 232. The SBW-CU 40 switches the shift range of the automatic transmission 10 based on position data of the selector lever 21.

The automatic transmission 10 is coupled to an output shaft of an engine (not illustrated). The automatic transmission 10 converts a driving force from the engine, for output. Here, the automatic transmission 10 includes a torque converter and a transmission. The torque converter has a lock-up clutch function and a torque amplification function. The transmission includes a transmission gear train and a control valve. The control vale is, for example, a hydraulic mechanism. Examples of the automatic transmission 10 include a stepped automatic transmission capable of automatically changing a speed by the control valve, and a continuously variable transmission (CVT) such as a chain CVT. In the present embodiment, the automatic transmission 10 includes the CVT.

A shift-by-wire (SBW) actuator 11 is attached to the automatic transmission 10. The SBW actuator 11 is electrically coupled to the SBW-CU 40. The SBW actuator 11 switches the shift range of the automatic transmission 10 in accordance with a control signal from the SBW-CU 40. The control signal from the SBW-CU 40 may be referred to as a "drive signal".

The SBW actuator 11 switches the shift range of the automatic transmission 10, for example, by moving a manual valve of the automatic transmission 10 in accordance with the control signal from the SBW-CU 40. The SBW actuator 11 includes an electric motor 12 that moves the manual valve. Here, the automatic transmission 10 is configured to take any one of a reverse travel range, a neutral (N) range, a forward travel range, a brake (B) range, and a parking (P) range. The reverse travel range may be referred to as a "reverse (R) range", and a forward travel range may be referred to as a "drive (D) range".

For example, a center console of the vehicle is provided with a selector lever 21 that receives a shift operation by the driver. The shift operation may be an operation for selecting a shift range of the automatic transmission 10.

The selector lever 21 is a momentary selector lever. As illustrated in FIG. 2, the selector lever 21 is movable on a shift gate 22. The shift gate 22 has an neutral (N) position determination region 22N, a home (H) position determination region 22H, a forward travel (D) position determination region 22D, and a reverse travel (R) position determination region 22R. The N position determination region 22N is disposed on a movement path between the H position determination region 22H, the D position determination region 22D, and the R position determination region 22R. The selector lever 21 automatically returns to the H position determination region 22H when not operated.

Further, as illustrated in FIG. 2, the shift gate 22 is formed in an "h" shape. It should be noted that "h" is the lower case of the alphabet. That is, the shift gate 22 includes a groove-shaped first gate 22a, a groove-shaped second gate 22b, and a groove-shaped third gate 22c. The groove-shaped first gate 22a extends in a vehicle longitudinal direction (corresponding to a vertical direction in FIG. 2). The groove-shaped second gate 22b has one end coupled to an intermediate portion of the first gate 22a and extends in a vehicle width direction (corresponding to right and left directions in FIG. 2). The groove-shaped third gate 22c has one end coupled to the other end of the second gate 22b and extends toward a vehicle rear direction (corresponding to a downward direction in FIG. 2).

The shift gate 22 includes the H position determination region 22H for determining whether the H position is selected, the N position determination region 22N for determining whether an N position is selected, the D position determination region 22D for determining whether a D position is selected, the R position determination region 22R for determining whether an R position is selected, and the B position determination region 22B for determining whether a B position is selected.

More specifically, the H position determination region 22H is disposed at an intersection of the second gate 22b and the third gate 22c. The H position determination region 22H is the home position where the selector lever 21 is located when the driver does not operate the selector lever 21. The selector lever 21 is configured to automatically return to the home position, for example, by an urging force of a spring when not operated.

The N position determination region 22N is disposed at an intersection of the second gate 22b and the first gate 22a. The N position determination region 22N is a position for shifting the automatic transmission 10 to the N range to bring the vehicle in a non-driven (neutral) state. When the driver operates the selector lever 21 from the H position to the D position or the R position, the selector lever 21 passes the N position determination region 22N. Further, when the selector lever 21 automatically returns from the D position or the R position to the H position, the selector lever 21 also passes the N position determination region 22N.

The D position determination region 22D is disposed at one end of the first gate 22a (more specifically, at the end of the first gate 22a on the vehicle rear side). The D position determination region 22D is a position for shifting the automatic transmission 10 to the D range to bring the vehicle in a forward travel state.

The R position determination region 22R is disposed at the other end of the first gate 22a (more specifically, at the end of the first gate 22a on the vehicle front side). The R position determination region 22R is a position for shifting the automatic transmission 10 to the R range to bring the vehicle in a reverse travel state.

The B position determination region 22B is disposed at the other end of the third gate 22c (more specifically, at the end of the third gate 22C on the vehicle rear side). The B position determination region 22B is a position for shifting the automatic transmission 10 to the B range to bring the vehicle in an engine brake operating state.

Each of the H position determination region 22H, the N position determination region 22N, the D position determination region 22D, the R position determination region 22R, and the B position determination region 22B has a predetermined size. When the selector lever 21 is continuously located (that is, when the selector lever 21 is continuously held) in any of the determination regions for a predetermined determination time or longer, it is determined that the position is selected. The range switching device 1 is provided with, for example, a parking switch. When the parking switch is operated, the automatic transmission 10 is switched to the parking (P) range. In this case, the automatic transmission 10 is in a state where the output shaft is locked.

A position of the selector lever 21 on the shift gate 22 (for example, a two-dimensional position) is detected by the position sensor 23. In an embodiment, the position sensor 23 may serve as a "position detector". More specifically, the position sensor 23 includes the first position sensor 231 and the second position sensor 232. In an embodiment, the first position sensor 231 may serve as a "first position detector". The first position sensor 231 detects a position of the selector lever 21 in the vehicle width direction (that is, right and left directions). In one embodiment, the second position sensor 232 may serve as a "second position detector". The second position sensor 232 detects a position of the selector lever 21 in the vehicle longitudinal direction. The position sensor 23 detects a two-dimensional position of the selector lever 21 (on the shift gate 22) based on (i) the position of the selector lever 21 in the vehicle width direction (that is, the right and left directions) and (ii) the position of the selector lever 21 in the vehicle longitudinal direction.

As the position sensor 23 (that is, the first position sensor 231 and the second position sensor 232), for example, a linear encoder, an angle sensor that detects an operation angle of the selector lever 21 may be used. The position sensor 23 (that is, the first position sensor 231 and the second position sensor 232) is coupled to the SBW-CU 40. The position data of the detected selector lever 21 is read into the SBW-CU 40. The position data of the detected selector lever 21 may be a detection signal according to the position of the detected selector lever 21. The detection signal indicates, for example, a voltage value.

As described above, the SBW-CU 40 is coupled to the SBW actuator 11. Further, the SBW-CU 40 is communicably coupled to a transmission control unit (TCU) 50 and the like via a CAN 100.

The TCU 50 is a control unit that controls the speed change in the automatic transmission 10. Various sensors such as an output shaft rotation sensor provided in the automatic transmission 10 are coupled to the TCU 50. Further, the TCU 50 receives, through the CAN 100, information such an engine speed and an opening degree of an accelerator pedal and information such as a shift range of the automatic transmission 10 transmitted from the SBW-CU 40.

The TCU 50 drives a solenoid valve (that is, an electromagnetic valve) based on various information such as the acquired output shaft rotation speed (corresponding to a vehicle speed), the engine speed, the opening degree of the accelerator pedal, and the shift range. The solenoid valve constitutes a control valve 15. The TCU 50 performs a speed change control of the automatic transmission 10 and the like. Here, the control valve 15 controls a hydraulic pressure for changing the speed of the automatic transmission 10. More specifically, the control valve 15 supplies the hydraulic pressure generated by an oil pump to, for example, a drive pulley and a driven pulley by opening and closing an oil passage using a spool valve and the solenoid valve that moves the spool valve. The TCU 50 transmits various information about the automatic transmission 10 to the SBW-CU 40 via the CAN 100.

The SBW-CU 40 generates and outputs a control signal based on the position data of the selector lever 21 input from the position sensor 23 (that is, the first position sensor 231 and the second position sensor 232) and the various input information received from the TCU 50. The output control signal is a motor drive signal. The SBW-CU 40 switches the shift range of the automatic transmission 10 by driving the SBW actuator 11. Here, the SBW-CU 40 has a function of, when the selector lever 21 moves from the D position or the R position to the N position, determining whether (i) the selector lever 21 returns by the momentary function or (ii) the driver wants to select the N position, without making an error or giving the driver a sense of discomfort.

Therefore, the SBW-CU 40 functionally includes a moving speed acquisition unit 41, a passage time acquisition unit 42, a determination time setting unit 43, a timing unit 44, and a determination unit 45. The SBW-CU 40 includes a microprocessor that performs calculation, an EEPROM that stores a program that causes the microprocessor to execute respective processing and the like, a RAM that stores various data such as a calculation result, a backup RAM that keeps stored data by a battery, and an input/output I/F including a driver circuit that drives the SBW actuator 11. The SBW-CU 40 implements the functions of the moving speed acquisition unit 41, the passage time acquisition unit 42, the determination time setting unit 43, the timing unit 44, and the determination unit 45 by executing the program stored in the EEPROM and the like by the microprocessor.

The moving speed acquisition unit 41 obtains a moving speed of the selector lever 21 in accordance with a change in the position of the selector lever 21 over time. In one embodiment, the moving speed acquisition unit 41 may serve as a "moving speed acquisition unit". For example, the moving speed acquisition unit 41 obtains the moving speed of the selector lever 21 based on (a) a time taken for the selector lever 21 to enter the N position determination region 22N after leaving the D position determination region 22D or the R position determination region 22R and (b) a distance between (i) the D position determination region 22D or the R position determination region 22R and (ii) the N position determination region 22N. The moving speed acquisition unit 41 outputs the acquired moving speed of the selector lever 21 to the passage time acquisition unit 42.

When the selector lever 21 moves from the D position or the R position toward the N position, the passage time acquisition unit 42 obtains an expected passage time expected to be taken for the selector lever 21 to pass the N position determination region 22N, based on the moving speed of the selector lever 21. In one embodiment, the passage time acquisition unit 42 may serve as a "passage time acquisition unit". Here, an expected passage time T is obtained by the following equation (1), where D is a path length in the N position determination region 22N and V is the moving speed of the selector lever 21. The passage time acquisition unit outputs the acquired expected passage time T to the determination time setting unit 43.

$$\text{Expected passage time } T = D/V \qquad (1)$$

The determination time setting unit 43 sets a neutral (N) determination time TN for determining whether the N position is selected, in accordance with the obtained expected passage time T. In one embodiment, the determination time setting unit 43 may serve as a "determination time setting unit". At that time, the determination time setting unit 43 may include (add) a margin in (to) the obtained expected passage time T and set the N determination time TN. Here, the determination time setting unit 43 obtains the N determination time TN, for example, by the following equation (2), where A is the margin.

$$N \text{ determination time } TN = A + \text{expected passage time } T \qquad (2)$$

In addition, at this time, the determination time setting unit 43 may set the margin A (that is, the N determination time TN) based on an ambient temperature. The ambient temperature is detected, for example, by an indoor temperature sensor of an air conditioner provided in the vehicle. The determination time setting unit 43 outputs the set N determination time TN to the determination unit 45.

The timing unit 44 includes a timer or a counter. The timing unit 44 measures a time during which the selector lever 21 is located (held) in the N position determination region 22N. In one embodiment, the timing unit 44 may serve as a "timing unit". Similarly, the timing unit 44 measures a time during which the selector lever 21 is located (held) in the D position determination region 22D, the R position determination region 22R, and the like. The timing unit 44 outputs the measured time to the determination unit 45.

The determination unit 45 determines that the N position is selected when the measured time reaches the N determination time TN or longer. On the other hand, when the measured time is less than the N determination time TN, the determination unit 45 determines that the selector lever 21 returns by the momentary function. In one embodiment, the determination unit 45 may serve as a "determination unit". Similarly, when the selector lever 21 is located in the D position determination region 22D or the R position determination region 22R for a predetermined time or longer, the determination unit 45 determines that the range is selected.

Figure 3:
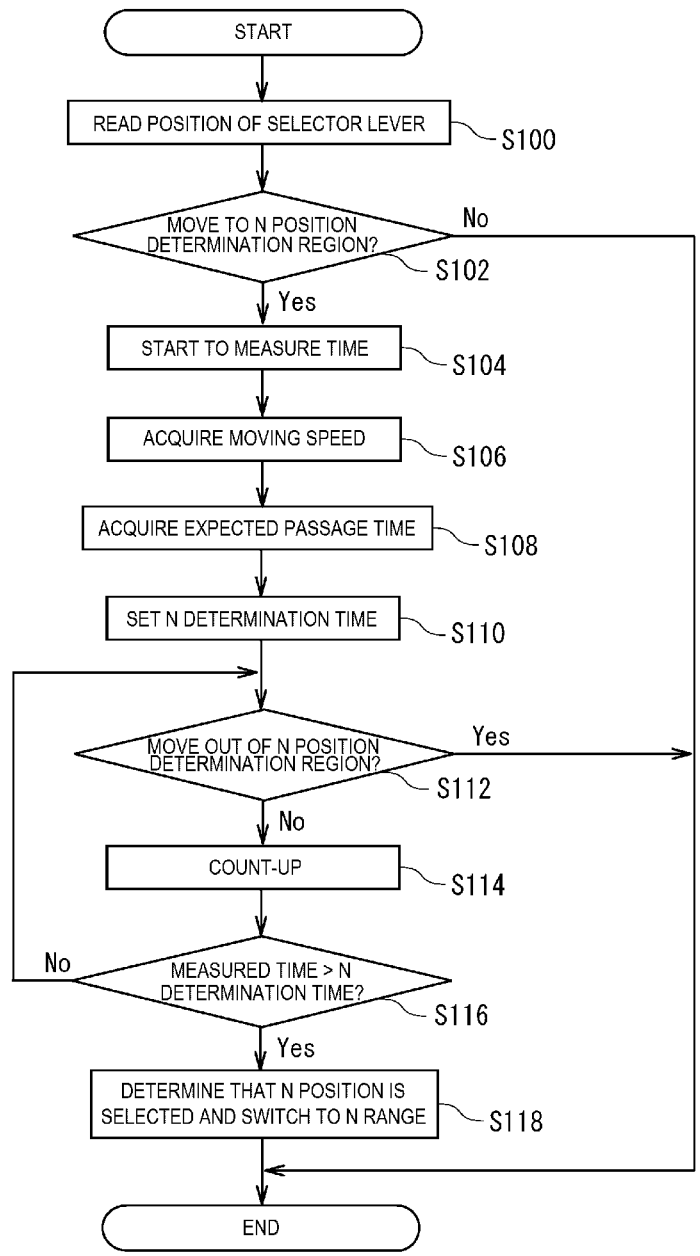
FIG. 3 is a flowchart illustrating a processing procedure of N range switching processing by the range switching device according to the first embodiment.

Next, the operation of the range switching device 1 will be described with reference to FIG. 3. FIG. 3 is a flowchart illustrating a processing procedure of N range switching processing by the range switching device 1. The processing is executed repeatedly at predetermined time intervals (for example, every 10 ms) mainly in the SBW-CU 40.

In step S100, a position of the selector lever 21 is read. Subsequently, in step S102, it is determined whether the selector lever 21 has been moved from the D position determination region 22D or the R position determination region 22R to the N position determination region 22N. Here, when the selector lever 21 has been moved from the D position determination region 22D or the R position determination region 22R to the N position determination region 22N, the processing proceeds to step S104. On the other hand, when the selector lever 21 has not been moved from the D position determination region 22D or the R position determination region 22R to the N position determination region 22N, the processing ends.

In step S104, it is started to measure a time during which the selector lever 21 is located in the N position determination region 22N, by the timer (or the counter starts to count-up). Next, in step S106, a moving speed of the selector lever 21 is calculated based on (a) a time taken for the selection lever 21 to move from the D position determination region 22D or the R position determination region 22R to the N position determination region 22N and (b) a distance between (i) the D position determination region 22D or the R position determination region 22R and (ii) the N position determination region 22N.

Subsequently, in step S108, an expected passage time expected to be taken for the selector lever 21 to pass the N position determination region 22N is calculated based on (i) the moving speed of the selector lever 21 and (ii) a movement path length in the N position determination region 22N of the shift gate 22. In the subsequent step S110, an N determination time for determining whether the N position is selected is set in accordance with the obtained expected passage time. A method for setting the N determination time is described above. Thus, a detailed description thereof will be omitted.

Next, in step S112, it is determined whether the selector lever 21 has moved out of the N position determination region 22N. Here, when the selector lever 21 has moved out of the N position determination region 22N, the processing ends. On the other hand, when the selector lever 21 has not moved out of the N position determination region 22N, the processing proceeds to step S114.

In step S114, the timer (or counter) that measures the time during which the selector lever 21 is located in the N position determination region 22N is counted up. Then, in step S116, it is determined whether the measured time has reached the N determination time or longer. Here, when the measured time has reached the N determination time or longer, the processing proceeds to step S118. On the other hand, when the measured time has not reached the N determination time or longer, the processing proceeds to step S112, and the processing of steps S112 to S116 is executed again (that is, repeated).

In step S118, it is determined that the N position is selected. Then, the SBW actuator 11 is driven, and the shift range of the automatic transmission 10 is switched to the N range. Then, the processing ends.

As described above, according to the embodiment, the position of the selector lever 21 is detected, and the moving speed of the selector lever 21 is obtained in accordance with the change in the position of the selector lever 21 over time. Then, when the selector lever 21 moves from the D position or the R position toward the N position, the expected passage time expected to be taken for the selector lever 21 to pass the N position determination region 22N is obtained based on the moving speed of the selector lever 21. The N determination time for determining whether the N position is selected is set in accordance with the obtained expected passage time. On the other hand, the time during which the selector lever 21 is located in the N position determination region 22N is measured. Then, when the measured time has reached the N determination time or longer, it is determined that the N position is selected. That is, the N determination time is varied in accordance with the expected passage time for the N position determination region 22N obtained based on the moving speed of the selector lever 21. Therefore, both (i) when the selector lever 21 automatically returns and (ii) when the driver operates the selector lever 21 from the D position or the R position to the N position, an appropriate N determination time is set in accordance with a real-time moving speed of the selector lever 21 at that time. Therefore, it is not necessary to excessively lengthen the determination time in order to prevent erroneous determination. As a result, when the selector lever 21 moves from the D position or the R position to the N position, it is possible to determine whether (i) the selector lever 21 returns by the momentary function or (ii) the driver wants to select the N position, without making an error or giving the driver a sense of discomfort.

At that time, according to the present embodiment, the two-dimensional position of the selector lever 21 is detected based on (i) the position of the selector lever 21 in the vehicle width direction and (ii) the position of the selector lever 21 in the vehicle longitudinal direction. Therefore, the two-dimensional position of the selector lever 21 (that is, on the shift gate 22) is accurately detected.

Further, according to the present embodiment, the moving speed of the selector lever 21 is obtained based on (a) the time required to enter the N position determination region 22N after leaving the D position determination region 22D or the R position determination region 22R and (b) the distance between (i) the D position determination region 22D or the R position determination region 22R and (ii) the N position determination region 22N. Therefore, the moving speed of the selector lever 21 is appropriately obtained.

Further, according to the present embodiment, the N determination time is set based on the ambient temperature.

Therefore, the N determination time is set more appropriately, for example, even at a very low temperature.

Second Embodiment

Figure 4:
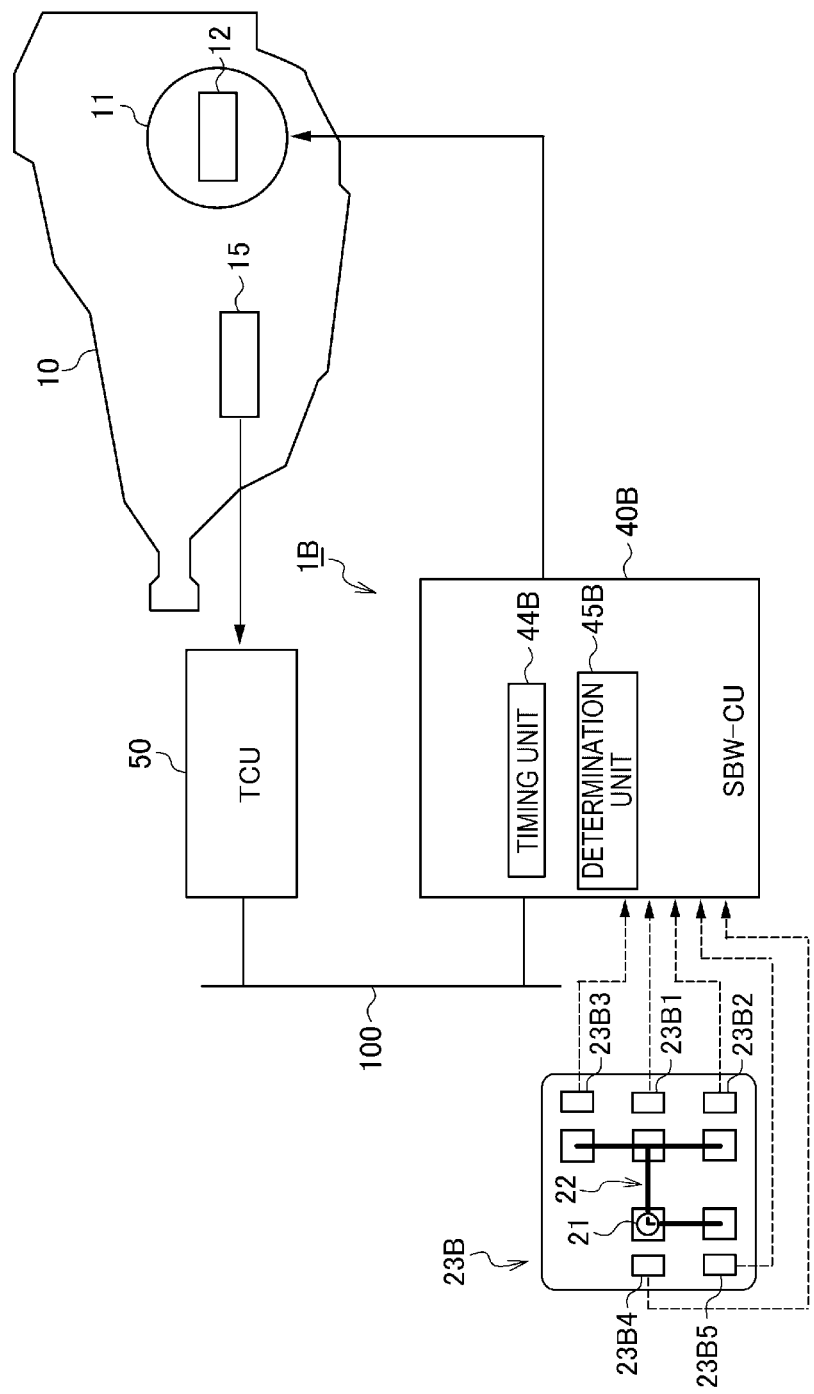
FIG. 4 is a block diagram illustrating the configuration of a range switching device according to a second embodiment.

Next, the configuration of a range switching device 1B according to a second embodiment will be illustrated with reference to FIG. 4. FIG. 4 is a block diagram illustrating the configuration of the range switching device 1B. In FIG. 4, components that are the same as or similar to those of the first embodiment are denoted by the same reference numerals.

The second embodiment is different from the first embodiment in that position sensors 23B1 to 23B5 are used instead of the position sensor 23. Further, the second embodiment is different from the first embodiment in that an SBW-CU 40B is used instead of the SBW-CU 40. Still further, the SBW-CU 40B is different from the SBW-CU 40 in that the SBW-CU 40B does not include the moving speed acquisition unit 41, the passage time acquisition unit 42, or the determination time setting unit 43, but includes a timing unit 44B instead of the timing unit 44 and a determination unit 45B instead of the determination unit 45. The other configurations are the same as or similar to those of the first embodiment. Thus a detailed description thereof will be omitted.

The position sensor 23B1 detects whether the selector lever 21 is located in the N position determination region 22N. The position sensor 23B2 detects whether the selector lever 21 is located in the D position determination region 22D. The position sensor 23B3 detects whether the selector lever 21 is located in the R position determination region 22R. The position sensor 23B4 detects whether the selector lever 21 is located in the H position determination region 22H. The position sensor 23B5 detects whether the selector lever 21 is located in the B position determination region 22B. In one embodiment, The position sensors 23B1 to 23B5 may serve as a "position detector". Detection data of each sensor is output to the SBW-CU 40.

When the selector lever 21 is located in any of the N position determination region 22N, the D position determination region 22D, the R position determination region 22R, the H position determination region 22H, and the B position determination region 22B for a predetermined time or longer, the determination unit 45B of the SBW-CU 40B determines that the range is selected, based on the detection results of the position sensors 23B1 to 23B5. In one embodiment, the determination unit 45B may serve as a "determination unit".

In particular, when determining that the D position has been selected, the determination unit 45B stops determining whether the N position is selected, until the selector lever 21 is then detected to be located in the H position determination region 22H or the R position determination region 22R. Similarly, when determining that the R position has been selected, the determination unit 45B stops determining whether the N position is selected, until the selector lever 21 is then detected to be located in the H position determination region 22H or the D position determination region 22D.

Figure 5:
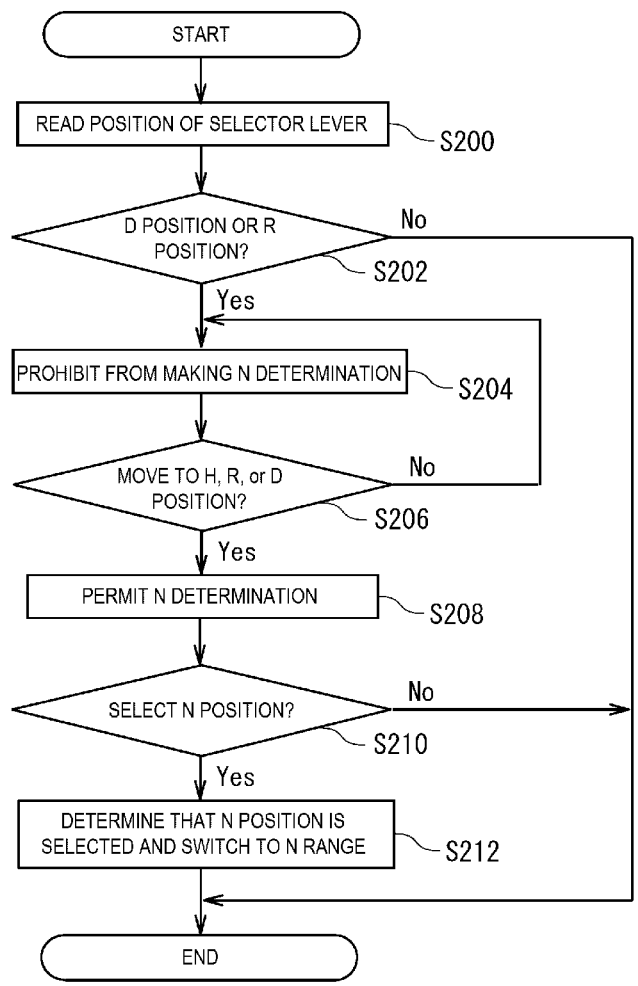
FIG. 5 is a flowchart illustrating a processing procedure of N range switching processing by the range switching device according to the second embodiment.

Next, the operation of the range switching device 1B will be described with reference to FIG. 5. FIG. 5 is a flowchart illustrating a processing procedure of N range switching processing performed by the range switching device 1B. The processing is executed repeatedly at predetermined time intervals (for example, every 10 ms) mainly in the SBW-CU 40B.

In step S200, a position of the selector lever 21 is read. Subsequently, in step S202, it is determined if the D position or the R position has been selected. Here, when the D position or the R position is selected, the processing proceeds to step S204. On the other hand, when the D position or the R position is not selected, the processing ends.

In step S204, it is prohibited to determine whether the N position has been selected. Subsequently, in step S206, it is determined whether the selector lever 21 has moved to another position other than the N position, that is, to any of the H position, the D position, and the R position. Here, when the selector lever 21 has moved to any of the H position, the D position, and the R position, the processing proceeds to step S208. On the other hand, when the selector lever does not move to the H position, the D position, or the R position, the processing proceeds to step S204. The processing in steps S204 to S206 is executed again (that is, repeated).

In step S208, it is permitted to determine whether the N position has been selected. Next, in step S210, it is determined whether the N position has been selected, that is, whether the selector lever 21 has been held in the N position determination region 22N for the predetermined time or longer. Here, when the N position has been selected, the processing proceeds to step S212. On the other hand, when the N position has not been selected, the processing ends.

In step S212, it is determined that the N position has been selected. Then, the SBW actuator 11 is driven, and the shift range of the automatic transmission 10 is switched to the N range. Then, the processing ends.

According to the present embodiment, when it is determined that the D position has been selected, the determination as to whether the N position has been selected is stopped until the selector lever 21 is then detected to be located in the H position determination region 22H or the R position determination region 22R. Similarly, when it is determined that the R position has been selected, the determination as to whether the N position has been selected is stopped until the selector lever 21 is then detected to be located in the H position determination region 22H or the D position determination region 22D. That is, when the selector lever 21 returns (moves) from the D position or the R position to the H position, the determination as to whether the N position has been selected is not made. Thus, erroneous determination is reliably prevented. When selecting the N position, the driver once returns the selector lever 21 to the H position or the like and moves the selector lever 21 from the H position or the like to the N position. Thereby, the driver can select the N position.

Although the embodiments of the disclosure have been described above, the disclosure is not limited to the above embodiments, and various modifications may be made. For example, the system configurations of the above embodiments are mere examples. The system configuration of the disclosure is not limited to the above embodiments. For example, the SBW-CU 40 and the SBW actuator 11 may be integrated. The SBW-CU 40 and the TCU 50 may be formed into a single unit.

Embodiments of the disclosure are applicable to a vehicle with no automatic transmission mounted, such as an electric vehicle (EV), a fuel cell vehicle (FCV), or a series hybrid vehicle (SHEV) that directly drives wheels by electric motors.

Further, the moving speed of the selector lever 21 may be calculated based on (i) a difference between a current position and a previous position of the selector lever 21 and (ii) a sampling period (time) of the position of the shift lever 21.

The invention claimed is:

1. A range switching device, comprising:
    a momentary selector lever movable on a shift gate comprising a neutral position determination region, a home position determination region, a forward travel position determination region, and a rearward travel position determination region, the neutral position determination region being disposed on a movement path between the home position determination region, the forward travel position determination region, and the reverse travel position determination region, the selector lever being configured to automatically return to the home position determination region when not operated;
    a position detector configured to detect a position of the selector lever;
    a moving speed acquisition unit configured to obtain a moving speed of the selector lever in accordance with a change in the detected position of the selector lever over time;
    a passage time acquisition unit configured to, when the selector lever moves from the forward travel position determination region or the reverse travel position determination region toward the neutral position determination region, obtain an expected passage time expected to be taken for the selector lever to pass the neutral position determination region on a basis of the obtained moving speed of the selector lever;
    a determination tune setting unit configured to set a neutral determination time for determining whether the neutral position is selected, in accordance with the obtained expected passage time;
    a timing unit configured to measure a time during which the selector lever is located in the neutral position determination region; and
    a determination unit configured to, when the measured time reaches the neutral determination time or longer, determine that the neutral position is selected,
    wherein the determination time setting unit changes the neutral determination time according to the obtained expected passage time that is based on the obtained moving speed of the selector lever.

2. The range switching device according to claim 1, wherein the position detector comprises:
    a first position detector configured to detect a position of the selector lever in a vehicle width direction; and
    a second position detector configured to detect a position of the selector lever in a vehicle longitudinal direction, and
    wherein the position detector detects a two-dimensional position of the selector lever on a basis of (i) the position of the selector lever in the vehicle width direction and (ii) the position of the selector lever in the vehicle longitudinal direction.

3. The range switching device according to claim 2, wherein the moving speed acquisition unit obtains the moving speed of the selector lever on a basis of:
    a time taken for the selector lever to enter the neutral position determination region after leaving the forward travel position determination region or the reverse position determination region; and
    a distance between (i) the forward travel position determination region or the reverse position determination region and (ii) the neutral position determination region.

4. The range switching device according to claim 3, wherein the determination time setting unit sets the neutral determination time on a basis of an ambient temperature.

5. The range switching device according to claim 2, wherein the determination time setting unit sets the neutral determination time on a basis of an ambient temperature.

6. The range switching device according to claim 1, wherein the moving speed acquisition unit obtains the moving speed of the selector lever on a basis of:
    a time taken for the selector lever to enter the neutral position determination region after leaving the forward travel position determination region or the reverse position determination region; and
    a distance between (i) the forward travel position determination region or the reverse position determination region and (ii) the neutral position determination region.

7. The range switching device according to claim 6, wherein the determination time setting unit sets the neutral determination time on a basis of an ambient temperature.

8. The range switching device according to claim 1, wherein the determination time setting unit sets the neutral determination time on a basis of an ambient temperature.

9. The range switching device according to claim 1, further including a processor coupled to a memory storing instructions for executing the position detector, the moving speed acquisition unit, the passage time acquisition unit, the determination time setting unit, the timing unit, and the determination unit.

10. The range switching device according to claim 1, wherein the determination time setting unit sets the neutral determination time on the basis of the obtained moving speed of the selector lever.

11. The range switching device according to claim 1, wherein the passage time acquisition unit obtains the expected passage time when the selector lever moves from the forward travel position determination region toward the neutral position determination region.

12. The range switching device according to claim 1, wherein the passage time acquisition unit obtains the expected passage time when the selector lever moves from the reverse travel position determination region toward the neutral position determination region.

13. The range switching device according to claim 1, wherein, during a shift operation, the determination time setting unit is programmed to change the neutral determination time according to the obtained expected passage time.

14. A range switching device, comprising:
    a momentary selector lever movable on a shift gate comprising a neutral position determination region, a home position determination region, a forward travel position determination region, and a rearward travel position determination region, the neutral position determination region being disposed on a movement path between the home position determination region, the forward travel position determination region, and the reverse travel position determination region, the selector lever being configured to automatically return to the home position determination region when not operated;
    a position detector configured to detect a position of the selector lever; and a processor coupled to a memory storing instructions, the processor being configured to:

obtain a moving, speed of the selector lever in accordance with a change in the detected position of the selector lever over time;

obtain, when the selector lever moves from the forward travel position determination region or the reverse travel position determination region toward the neutral position determination region, an expected passage time expected to be taken for the selector lever to pass the neutral position determination region on a basis of the obtained moving speed of the selector lever;

set a neutral determination time for determining whether the neutral position is selected, in accordance with the obtained expected passage time;

measure a time during which the selector lever is located in the neutral position determination region; and determine, when the measured time reaches the neutral determination time or longer, that the neutral position is selected, wherein the neutral determination time changes according the obtained expected passage time that is based on the obtained movie speed of the selector lever.

15. The range switching device according to claim 14, wherein the processor is configured to set the neutral determination time on the basis of the obtained moving speed of the selector lever.

16. The range switching device according to claim 14, wherein the expected passage time is obtained when the selector lever moves from the forward travel position determination region toward the neutral position determination region.

17. The range switching device according to claim 14, wherein the expected passage time is obtained when the selector lever moves from the reverse travel position determination region toward the neutral position determination region.

18. The range switching device according to claim 14, wherein, during a shift operation, the neutral determination time is changed according to the obtained expected passage time.

\* \* \* \* \*